July 11, 1961  R. O. NUSBAUM  2,992,037
CONVERTIBLE HOUSE-TRAILER
Filed March 5, 1959  2 Sheets-Sheet 1

INVENTOR.
ROBERT O. NUSBAUM
BY M. A. Hobbs
ATTORNEY

July 11, 1961 R. O. NUSBAUM 2,992,037
CONVERTIBLE HOUSE-TRAILER
Filed March 5, 1959 2 Sheets-Sheet 2

INVENTOR.
ROBERT O. NUSBAUM
BY M. A. Hobbs
ATTORNEY

United States Patent Office 2,992,037
Patented July 11, 1961

2,992,037
CONVERTIBLE HOUSE-TRAILER
Robert O. Nusbaum, 2107 Goshen Avenue Road, Elkhart, Ind.
Filed Mar. 5, 1959, Ser. No. 797,489
5 Claims. (Cl. 296—23)

The present invention relates to a portable house and more particularly to a convertible house and trailer combination.

One of the principal objects of the present invention is to provide a structure which is adapted for use as a house or camping trailer and which can be readily converted into a stationary house adapted for such uses as an ice fishing house, an office on construction sites, a portable beach house, and outside latrine.

Another object of the invention is to provide a structure which can easily and safely be towed on highways and roads at normal cruising speeds and used as a trailer for hauling camping equipment and for an overnight bed, and which can be used at any desired location as a semi-permanent building for storage and the like while the undercarriage is used for general hauling purposes.

Still another object of the invention is to provide a structure of the aforesaid type which can be converted from a trailer to a house as a one man operation and without tools or special equipment.

A further object is to provide a convertible house and trailer combination which has all the advantages of a permanent house of comparable size when used as a house and which performs satisfactorily as a trailer, with good roadability and handling when used as a trailer.

Another object is to provide a convertible house and trailer structure which is relatively simple in construction and can be manipulated quickly to convert the structure from a trailer into a house.

Another object of the invention is to provide a convertible structure of the foregoing type which is compact, relatively simple in construction and operation, and which can be towed by an automobile into approximately the desired location and then easily maneuvered manually as a trailer into the exact desired place before converting it into a house.

Additional objects and advantages of the present invention will become apparent from the following description and accompanying drawings, wherein.

Figure 1:
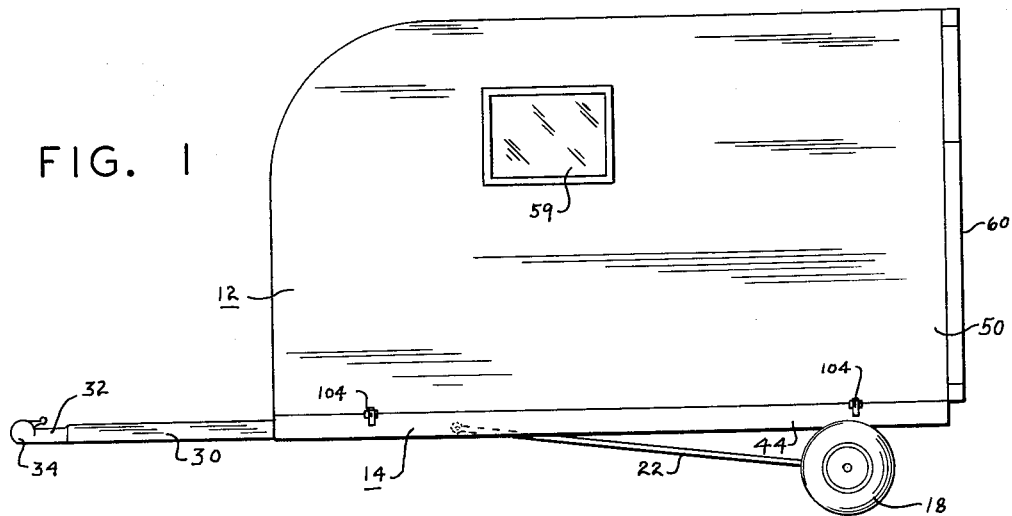
FIGURE 1 is a side elevational view of my convertible house-trailer showing the structure in the position it assumes when being used as a trailer.
Figure 2:
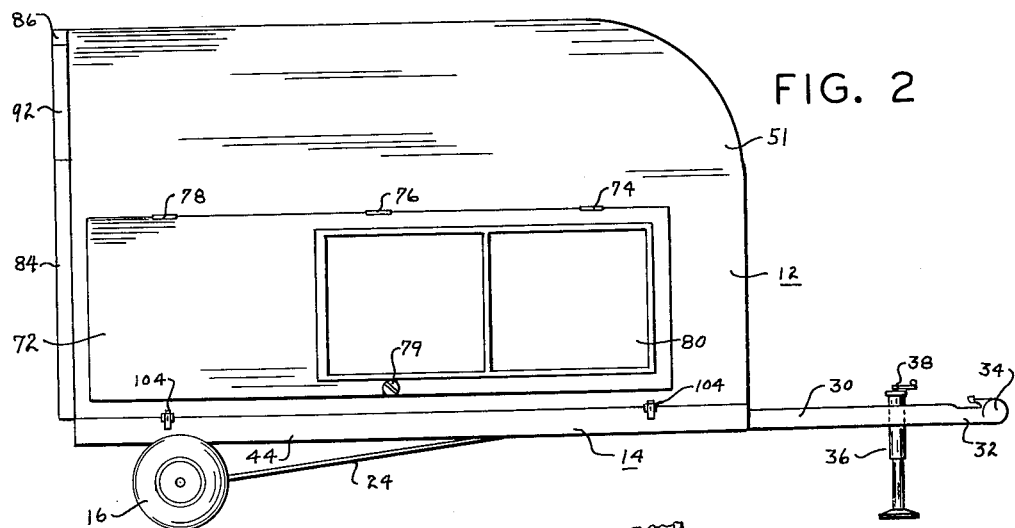
FIGURE 2 is a side elevational view of the house-trailer shown in the preceding figure, showing the opposite side thereof.

Referring more specifically to the drawings and to FIGURES 1 and 2 in particular wherein my convertible house-trailer is shown complete, numeral 12 designates generally the house portion and 14 the undercarriage including wheels 16 and 18, axle 20, tie rods 22 and 24, and springs 26 and 28. The undercarriage is provided with a reinforced extension 30 to which is rigidly connected a tow bar 32 having a hitch 34 for connecting the trailer to a towing vehicle, such as an automobile or truck. A parking stand 36 is secured to extension 30 and is adjustable upwardly and downwardly by a handle 38 to adapt its length to uneven terrain so that the lower side of the house when it is in the position shown in FIGURES 1 and 2 is level. The stand is either fully retractable or removable so that it will not interfere with the operation of the structure when it is being used as a trailer; the construction of the stand making it adjustable and the manner in which the stand is secured to extension 30 are not material to the present invention. The upper side of the undercarriage is flat and smooth, preferably consisting of a floor 40 of plywood or the like, and is supported by cross members 42 terminating at the outside ends at frame members 44. The undercarriage and the structural parts thereof may be considered as conventional or standard equipment and parts for the purpose of the present description, and therefore will not be described in detail herein.

Figures 5, 6:
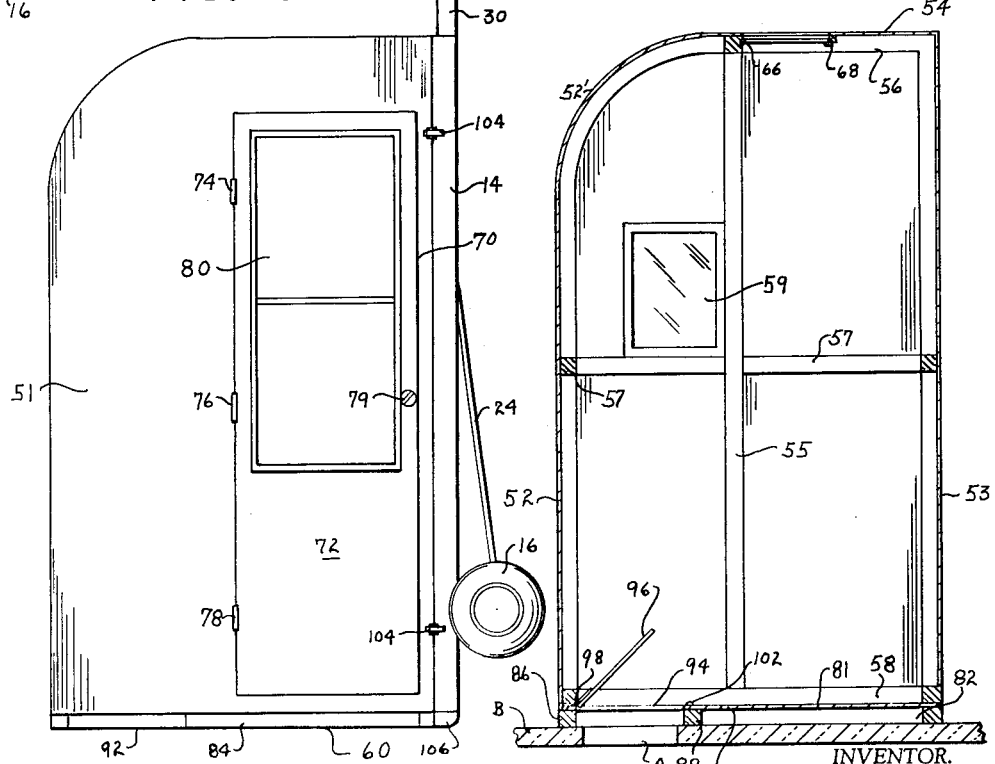
FIGURE 5 is a side elevational view of my house-trailer shown in the position and condition it assumes when being used as a stationary house.
FIGURE 6 is a vertical cross sectional view of the house-trailer shown in the preceding figures taken on line 6—6 of FIGURE 4, but uprighted into the position assumed when being used as a stationary house.

The house portion 12 consists of four walls 50, 51, 52 and 53 supported by a suitable frame consisting of two-by-two vertical members 55 and horizontal members 56, 57 and 58 as seen in FIGURE 6, joined together by nailing or with screws, bolts or the like (not shown), the sides and front end 54 being constructed of sheet metal such as aluminum, or of plywood. The top side 52 and front 54 are connected by a sweeping curved portion 52' to reduce the wind resistance and improve the overall appearance of the structure. The window and door arrangement is important in the present convertible structure since the windows and doors must be placed where they can be useful whether the structure is being used as a house or a trailer. Window 59 in side 50 is spaced from the rear end 60, as seen in FIGURE 1, sufficient distance to place the window at the proper height when the house portion is uprighted to the position shown in FIGURES 5 and 6. This window is also placed high enough from the lower side 53 when the structure is in the position shown in FIGURE 1 to be used satisfactorily. Window 62 in the front end 54 serves both as a window and a ventilator when the house portion is being used either as a house or a trailer, the frame of the window being hinged at numeral 66 and latched at numeral 68. A door 70 sufficiently large to permit an average sized man to walk through without stooping when the house portion is in the position shown in FIGURES 5 and 6 is provided in the lower half of wall 51 when the house portion is in the position shown in FIGURE 2. The swinging door 72 is hung with the hinges 74, 76 and 78 along the upper edge when the house portion is being used as a trailer so that the door 72 will remain closed if it should accidentally become unlatched while the house-trailer is being towed on the highway. A door latch 79 is placed at the lower edge of door 72 and the handle therefor is preferably flush with or projects only slightly beyond the outside surface of side 51. The door may, if desired, contain a window such as that shown at numeral 80.

Figure 4:
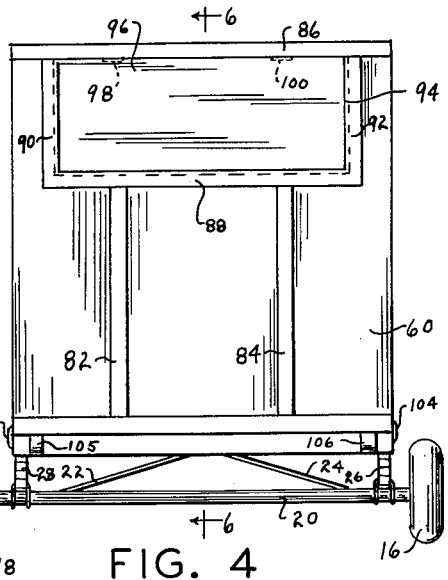
FIGURE 4 is a rear elevational view of my house-trailer shown in the preceding figures in the position it assumes when being used as a trailer.

Since one of the important uses for which the present convertible house-trailer has been designed is ice fishing, the rear end 60 is of special construction consisting of wall panel 81, sills 82 and 84 and frame members 86, 88, 90 and 92 secured to the outside surface of panel 81 and adapted to rest directly on the ice and form in effect the footing for the house portion when the latter is in its upright position shown in FIGURES 5 and 6. The frame members define an opening 94 which communicates with an opening A in the ice B through which the fishermen in the house drop their lines. This opening is closed by a door 96 swung on hinges 98 and 100 at the top of the opening when the house is in the trailer position, as shown in FIGURE 4, said door being held in closed position and locked by a latch 102 on the end on panel 81.

Figure 7:
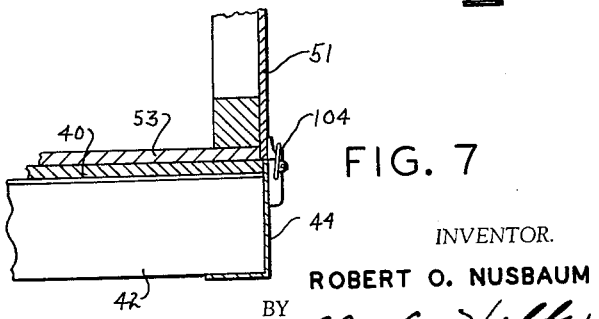
FIGURE 7 is an enlarged fragmentary cross sectional view of a portion of the house and the undercarriage, showing in greater detail the manner in which the house is secured to the carriage.
Figure 3:
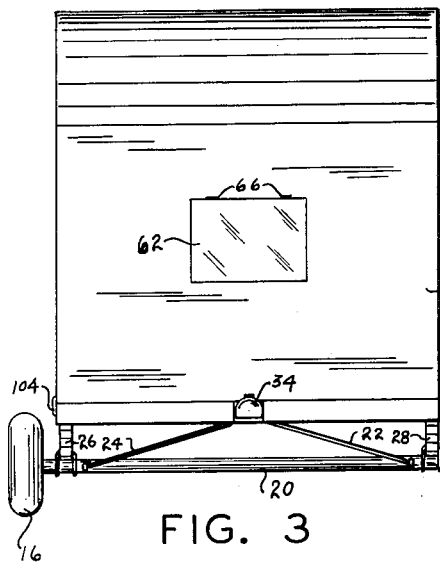
FIGURE 3 is a front elevational view of the house-trailer shown in the same position as in the preceding figures.

The house portion 12 may be secured to undercarriage 14 by any suitable means, the means shown consisting of a plurality of large conventional luggage type latches 104, one part thereof being secured by screws or bolts to the lower edge of the house portion and the other part similarly secured to the side of the undercarriage, as shown in FIGURE 7. These latches can readily be uncoupled and the house portion disengaged from the undercarriage either before or after the former has been tilted to its upright position. If the latches are released while the unit is in the position shown in FIGURES 1 and 2, the house portion can be easily slid rearwardly and then uprighted with the undercarriage remaining horizontal.

Figure 8:
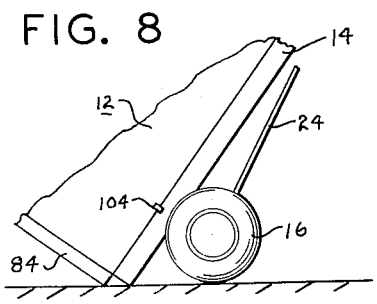
FIGURE 8 is a fragmentary side elevational view of the house-trailer showing the relationship of wheels to the rear end.

Another important feature of the present convertible house-trailer is illustrated in FIGURE 8. In the present structure the wheels are placed sufficiently close to the rear end of the undercarriage that the house portion 12 is approaching its uprighted position when the rear end contacts the ground, ice, or other supporting surface, in a manner similar to that shown in FIGURE 8. This permits the house-trailer to be tilted to the uprighted position using the tow bar as a handle and the axle as the pivot point. When it has been lifted to the position illustrated in said figure, the center of gravity is near a line projected vertically from the axle and consequently the house can be easily erected to the fully upright position. The wheels are so positioned along the sides of said undercarriage that when the undercarriage is tilted rearwardly the sills will not contact the supporting surface until the center of gravity is in the proximity of or beyond a line projected vertically from the axis of the wheels. The unit will rest unassisted in the position shown in FIGURE 8. This entire uprighting operation can be performed by one average man without the assistance or use of any tools or equipment.

As seen in FIGURE 5, the undercarriage can be left attached to the house portion without in any way interfering with the use of the house portion, or if desired the undercarriage can be removed. To assist in supporting the undercarriage and removing it from the house portion after the unit has been uprighted as shown in FIGURE 5, the bed of the undercarriage may extend rearwardly such that it is even with the outer surface of sills 82 and 84, or as an alternative, legs 105 and 106, as shown in FIGURES 4 and 5, may be mounted on the rear of the undercarriage bed or frame to contact the supporting surface.

When the present convertible house-trailer is in the condition shown in FIGURES 1 and 2, it can effectively be used to haul and store articles such as camping equipment and the like, and can be used as sleeping quarters on camping trips. Since the center of gravity of the house-trailer combination is low, the roadability of the unit is excellent under all normal driving conditions, and it can be towed at high cruising speed without danger of turning over. After it has been uprighted, it can be conveniently used as a small building for the various purposes enumerated previously herein and the undercarriage, after being detached from the house portion, can be used as a conventional trailer for hauling.

While only one embodiment of my convertible house-trailer has been described herein in detail, various changes and modifications can be made without departing from the scope of the invention.

I claim:

1. A convertible house-trailer combination, comprising opposed lateral walls, a top and bottom wall joined to said lateral walls, a front end wall connected to said walls, said front wall being connected to said top wall by a sweeping curved portion, a rear end wall joined to said lateral, top and bottom walls, a window in one of said lateral walls spaced forward of the rear half and above the lower half of said wall, an opening in the other lateral wall in the bottom half and extending substantially the full length thereof, a door for said opening, hinges for said door joined to the respective side wall at the upper edge of said opening, a window in said front wall near the center thereof, an opening in said rear wall near the upper edge thereof, a door for said last mentioned opening, hinges on the side of said last mentioned opening adjacent the top wall for said last mentioned door, two parallel sill members on the outside surface of said rear wall, frame members on the outside surface of said rear wall around the opening therein, an undercarriage for supporting said walls with the bottom wall in contact therewith having a pair of laterally spaced wheels, said wheels being spaced inwardly from the rear wall a distance greater than the diameter of said wheels and being positioned along the sides of said undercarriage such that when the undercarriage is tilted rearwardly said sills will not contact the supporting surface until the center of gravity is in the proximity of or beyond a line projected vertically from the axis of said wheels, and releasable means for securing said walls to said undercarriage.

2. A convertible house-trailer combination, comprising opposed lateral walls, a top and bottom wall joined to said lateral walls, a front end wall connected to said walls, said front wall being connected to said top wall by a sweeping curved portion, a rear end wall joined to said lateral, top and bottom walls, an opening in one lateral wall in the bottom half and extending substantially the full length thereof, a door for said opening, hinges for said door joined to the respective side wall at the upper edge of said opening, an opening in said rear wall near the upper edge thereof, a door for said last mentioned opening, hinges on the side of said last mentioned opening adjacent the top wall for said last mentioned door, two parallel sill members on the outside surface of said rear wall around the opening therein, an undercarriage for supporting said walls with the bottom wall in contact therewith having a pair of laterally spaced wheels, said wheels being spaced inwardly from the rear wall a distance greater than the diameter of said wheels and being positioned along the side of said undercarriage such that when the undercarriage is tilted rearwardly said sills will not contact the supporting surface until the center of gravity is beyond a line projected vertically from the axis of said wheels, and releasable means for securing said walls to said undercarriage.

3. A convertible house-trailer combination, comprising opposed lateral walls, a top and bottom wall joined to said lateral walls, a front end wall connected to said walls, a rear end wall joined to said lateral, top and bottom walls, an opening in one lateral wall in the bottom half and extending substantially the full length thereof, a door for said opening, hinges for said door joined to the respective side wall at the upper edge of said opening, an opening in said rear wall, a door for said last mentioned opening, hinges on the upper side of said last mentioned opening for said last mentioned door, sill members on the outside surface of said rear wall, frame members on the outside surface of said rear wall around the opening therein, an undercarriage for supporting said walls with the bottom wall in contact therewith having a pair of laterally spaced wheels, said wheels being spaced inwardly from the rear wall a distance greater than the diameter of said wheels and being positioned along the side of said undercarriage such that when the undercarriage is tilted rearwardly said sills will not contact the supporting surface until the center of gravity is in the proximity of a line projected vertically from the axis of said wheels, and releasable means for securing said walls to said undercarriage.

4. A convertible house-trailer combination, comprising opposed lateral walls, a top and bottom wall joined to said lateral walls, a front end wall connected to said walls, a rear end wall joined to said lateral, top and bottom walls, an opening in one lateral wall extending substantially the full length thereof, a door for said opening, hinges for said door joined to the respective side wall at the upper edge of said opening, an opening in said rear wall, a door for said last mentioned opening, an undercarriage for supporting said walls with the bottom wall in contact therewith having a pair of laterally spaced wheels, said wheels being spaced inwardly from the rear wall a distance greater than the diameter of said wheels and being positioned along the side of said undercarriage such that when the undercarriage is tilted rearwardly said rear wall will not contact the supporting surface until the center of gravity is beyond a line projected vertically from the axis of said wheels, and releasable means for securing said walls to said undercarriage.

5. A convertible house-trailer combination, comprising opposed lateral walls, a top and bottom wall joined to said lateral walls, a front end wall connected to said walls, a rear end wall joined to said lateral, top and bottom walls, an opening in one lateral wall, extending substantially the full length thereof, a door for said opening, hinges for said door joined to the respective side wall at the upper edge of said opening, an opening in said rear wall, a door for said last mentioned opening, an undercarriage for supporting said walls with the bottom wall in contact therewith having a pair of laterally spaced wheels, said wheels being spaced inwardly from the rear wall a distance greater than the diameter of said wheels and being positioned along the side of said undercarriage such that when the undercarriage is tilted rearwardly said rear wall will not contact the supporting surface until the center of gravity is beyond a line projected vertically from the axis of said wheels.

References Cited in the file of this patent

UNITED STATES PATENTS

| | | |
|---|---|---|
| 976,572 | Jeffery | Nov. 22, 1910 |
| 1,255,222 | Potts | Feb. 5, 1918 |
| 1,427,365 | Douglas | Aug. 29, 1922 |
| 2,473,076 | Scheibner | June 14, 1949 |
| 2,833,000 | Jurgensen | May 6, 1958 |

FOREIGN PATENTS

| | | |
|---|---|---|
| 145,052 | Sweden | Apr. 27, 1954 |